Oct. 11, 1960  H. K. LEISTRITZ  2,955,671
INDUCTION SILENCERS FOR INTERNAL COMBUSTION ENGINE CARBURETORS
Filed Aug. 16, 1955  3 Sheets-Sheet 1

Oct. 11, 1960  H. K. LEISTRITZ  2,955,671
INDUCTION SILENCERS FOR INTERNAL COMBUSTION ENGINE CARBURETORS
Filed Aug. 16, 1955  3 Sheets-Sheet 2

Oct. 11, 1960 H. K. LEISTRITZ 2,955,671
INDUCTION SILENCERS FOR INTERNAL COMBUSTION ENGINE CARBURETORS
Filed Aug. 16, 1955 3 Sheets-Sheet 3

United States Patent Office 2,955,671
Patented Oct. 11, 1960

2,955,671

INDUCTION SILENCERS FOR INTERNAL COMBUSTION ENGINE CARBURETORS

Hans Karl Leistritz, Basaltstrasse 38, Frankfurt am Main, Germany

Filed Aug. 16, 1955, Ser. No. 528,749

Claims priority, application Germany Aug. 25, 1954

10 Claims. (Cl. 181—48)

The invention relates to induction silencers for internal combustion engine carburetors, and is concerned with such silencers in which air is induced through a chamber to the carburetor, the air flowing through at least one tubular inlet duct into the chamber extending transversely to the outlet or suction direction of the chamber.

In known induction silencers of this construction, two pipes in the form of tubular inlet ducts are provided opening into a common intermediate space, so that the air induced enters this intermediate space in opposite directions, and is then diverted to the direction of outlet induction which is perpendicular to the inlet pipes. The external inlet ends of these inlet pipes are both provided with air filters, and their cross-section is greater than the cross-section of the intermediate space as measured with reference to the suction direction (i.e. the suction direction of the carburetor connection). The intermediate space does not afford an acoustically effective silencing chamber.

The silencing obtained with this known method of construction is small for two reasons, firstly because no consideration is given to the fact that the cross-section of the intermediate chamber lying between the inlet pipes must be matched to the cross-section of these pipes, and secondly because the air filter or other external hindrance to the flow into the inlet pipes upsets the acoustic silencing effect of these pipes.

In contra-distinction, in accordance with the invention there is provided an induction silencer for internal combustion engine carburetors, comprising a chamber, an outlet from said chamber for delivering induced air in the desired outflow direction, an inlet pipe extending into said chamber and lying transverse to said outflow direction, said pipe being freely open to the atmosphere at its outer end and having a cross-section which is a fraction of the cross-section of the flow passage afforded by said chamber, and an air filter associated with said chamber at a location in the flow path after said inlet pipe.

The cross-section and preferably also the volume of the inlet pipe or each inlet pipe can thus be kept small, with short entry paths for the initially induced air passing through said pipe or pipes into the chamber which gives the inlet pipe the most favourable filtering action.

For a better understanding of the invention, several constructional forms thereof will now be described with reference to the accompanying diagrammatic drawings, in which.

Figure 1:
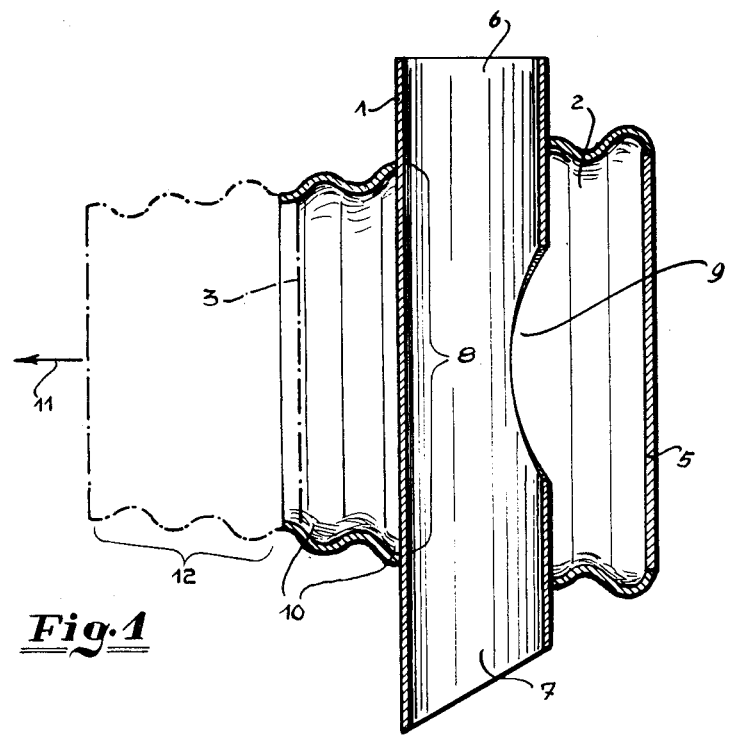
Figure 1 is a longitudinal section of a first form of induction silencer.

Referring now to Figure 1, there is shown a transverse entry pipe 1 having a smooth internal wall and open to the atmosphere at both ends 6 and 7. The pipe 1 is of cylindrical form, and passes through an intermediate chamber in a casing 2 at a location spaced from the closed end wall 5 of the latter, the pipe projecting from the chamber at both ends. The length and volume of the pipe are matched to the intermediate chamber in accordance with engine and suction conditions, but its inside cross-section, which is equal to that of the openings 6 and 7, is substantially smaller than the cross-section at 8 of the intermediate chamber, being only a fraction of such cross-section at 8. The transverse pipe 1 opens through a cut-out 9 towards the closed end 5 of the casing 2, as shown in Figure 1. The cut-out 9 may be located on the other side of the pipe 1. A space is formed between the transverse pipe and the end wall 5 in the illustrated example. This space is of a cross-sectional area greater than the cross-section of said transverse pipe. The cross-section of the cut-out 9 is greater than, and preferably twice as great as, or a multiple of, the inside cross-section of the pipe 1.

The intermediate chamber is formed from a corrugated pipe consisting of rings 10 of substantially semi-circular cross-section, made for example, of rubber or other elastic material or of metal. The chamber tapers and opens in the direction of the arrow 11 towards the carburetor (not shown). The rings shown in broken lines in the region 12 indicate that the concertina-like pipe can be cut off at a location which is chosen so that its cross-section corresponds to that of the carburetor suction connection, or that of an air filter. Alternatively, as shown in Figure 1, an air filter 3 can be located in the concertina-like pipe instead of the extremity thereof.

The filter 3 may consist of a simple dust strainer extending across the concertina-like pipe.

Figure 2:
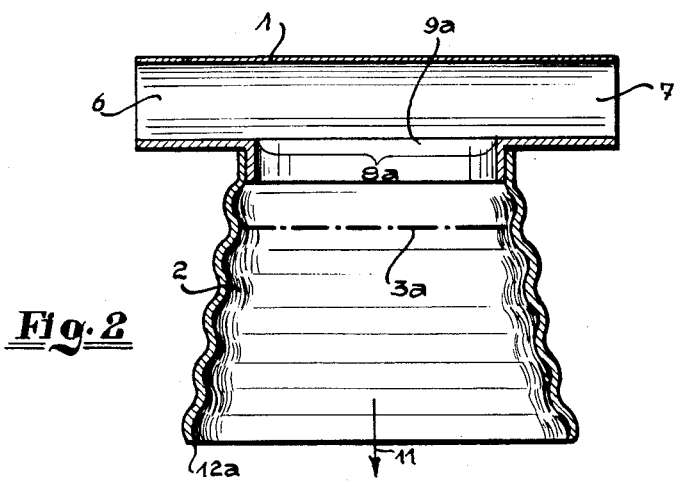
Figure 2 is a view similar to Figure 1, but showing a second form of induction silencer in longitudinal section.

In Figure 2 the intermediate chamber 2 is likewise constructed as a concertina-like pipe, but diverges conically in the direction of suction 11 towards the carburetor, and is closed at the other end by the transverse pipe 1 which is open at both ends 6 and 7, and which opens directly into the chamber 2 by way of a cut-out 9a. As regards the cross-sectional dimensioning of the transverse pipe 1 and of its inlets 6 and 7 in relation to the chamber cross-section at 8a and the aperture 9a, the same applies as in Figure 1. Likewise as regards the fitting of a normal air filter at the open end of the chamber 2 or for example in the form of a dust strainer at 3a.

Figure 3:
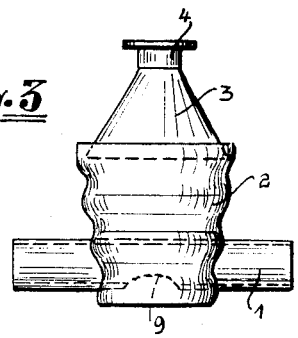
Figure 3 is an elevation of an induction silencer similar to that shown in Figure 2.

Figure 3 shows diagrammatically the air filter arrangement when the air filter 3 is fitted at the end of the chamber 2 in a construction similar to Figure 2, but with a transverse pipe 1 passing through the chamber 2, as in Figure 1.

Figure 4:
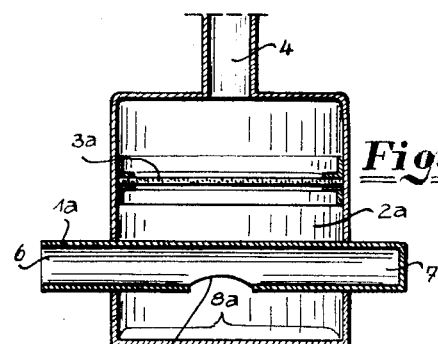
Figure 4 is a longitudinal section of a third form of induction silencer.

Figure 4 shows the arrangement of the air filter alternatively described above as a dust strainer 3a extending across the intermediate chamber 2a, the chamber being constructed simply as a rectangular enclosed space opening out into the carburetor connection 4. The transverse pipe 1a is open at one end at 6, but closed at 7, the latter for matching to forms of engine construction wherein such a closure produces more favourable pulsation conditions in the pipe 1a, which in all constructional forms, constitutes a sound or filtering chamber for a number of noise frequencies in the induction noise. The cross-section of the transverse pipe and its outlet cross-section 9 are dimensioned correspondingly to the forms of construction according to Figures 1 to 3 in relation to the chamber cross-section 8a and its volume is dimensioned likewise.

Figure 5:
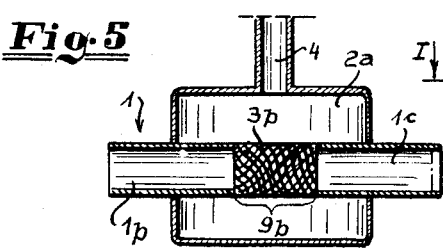
Figure 5 is a view similar to Figure 4, but showing a fourth construction.

In the form of construction according to Figure 5, the transverse pipe indicated generally at 1 is made in two parts 1b and 1c aligned with one another and either both opening into the atmosphere at their outer ends, or one thereof being closed. Inside the chamber 2a the ends of the parts 1b and 1c of the pipe are spaced a small distance 9b from one another, this spacing having the same effect as the outlet aperture 9 of the forms of construction previously described.

The space 9b between the parts 1b and 1c of the transverse pipe can be enclosed by filtering material which may consist of woven metal composed of individual helically wound metal strips forming a dust strainer. In this case a separate dust strainer 3 or 3a can be omitted, and the chamber 2a can be connected directly to the carburetor.

It is apparent that the aperture 9 or 9a of the constructions according to Figures 1 to 4, can likewise be enclosed with similar filtering material, and thus if desired a separate dust strainer 3 or 3a can be made superfluous.

Figure 6:
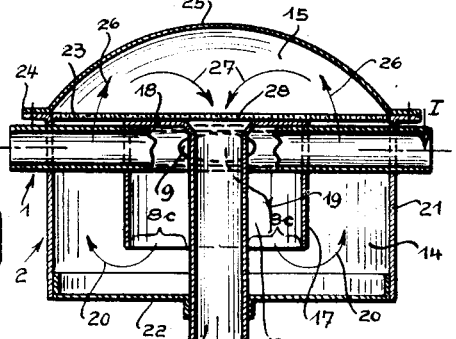
Figure 6 is a sectional side elevation of a fifth constructional form.
Figure 7:
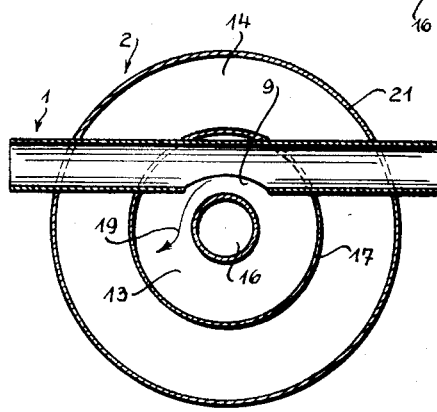
Figure 7 is a sectional plan taken on the line I—I of Figure 6.
Figure 8:
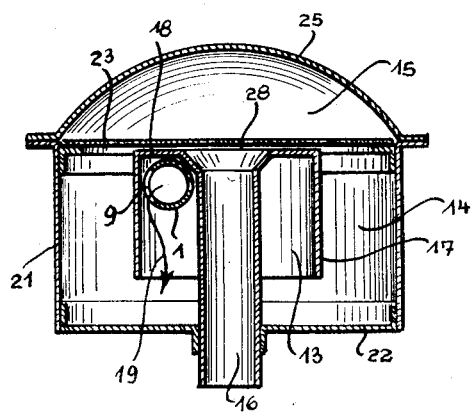
Figure 8 is a view similar to Figure 6, but with the plane of the cross-section at right angles to that of Figure 6.

In the form of construction according to Figures 6 to 8, the intermediate chamber indicated generally at 2 is divided into three chamber portions 13, 14 and 15. The chamber portions 13 and 14 surround one another concentrically, and advantageously also concentrically surround a suction pipe 16 connected in the direction of the arrow to the carburetor joint (not shown). The transverse pipe 1 passes through the two concentric chamber portions 13 and 14, and opens by way of its central cut-out 9 into the inlet chamber portion 13, which is separated by an annular partition 17 from the chamber portion 14, and has an end wall 18. The inner wall of the chamber portion 13 is formed by the suction pipe 16. The air induced through both open ends of the pipe 1, enters the chamber portion 13 in the direction of the arrow 19 through the aperture 9 of the pipe, and is reversed in the direction of the arrow 20 towards the chamber portion 14 formed by the concentric wall 21 and the end wall 22 in conjunction with the partition 17. The chamber portion 14 thus forms a first reversing chamber. The other end of this chamber is closed by a filtering wall 23 of any convenient known filtering material, such material allowing the passage of air and holding back dust. The filter insert 23 extends over the whole cross-section of the third chamber portion 15 and thus extends over the portion 14, the closed end wall 18 of the portion 13 and the central suction pipe 16.

The chamber portion 15 is formed by a dome-shaped wall 25 attached over the chambers 13 and 14 with the aid of flanges bolted through as at 24. The chamber portion 15 constitutes a second reversing chamber, by which the air flow entering in the directions of the arrows 26 is again reversed to the directions of the arrows 27, and drawn off in the direction of the suction pipe 16. In this way the air flow, which has once already passed the filtering wall 23, again passes through the filtering wall 23, whereby particularly good dust filtering is attained.

The annular cross-section 8c of the chamber 13 is substantially greater than, and in fact a multiple of, the inside cross-section of the transverse pipe 1.

One end of the transverse pipe 1 can be closed in this form of construction also, as in Figure 4, in accordance with the desired conditions and matching of the noise filter pipe 1 to the volume of the chamber. The aperture 9 can likewise be covered in this form of construction also by an additional metal strip filter or the like, but this would as a rule be unnecessary on account of the good filtering. In addition, the pipe 1 can be made in two parts, as in Figure 5, one part passing through the chamber portion 14 from one side and the other passing through the portion 14 from the other side, and both parts opening out into the chamber portion 13.

Figure 9:
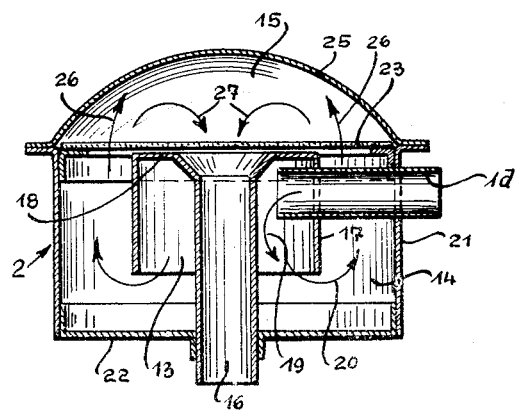
Figure 9 is a view similar to Figure 6, but showing a sixth constructional form.

In the form of construction according to Figure 9, the externally open transverse pipe 1d passes through the first reversing chamber portion 14 on one side only, and opens out into the inner chamber portion 13, as in Figures 6 to 8. Generally, the same considerations apply as in the construction according to Figures 6 to 8 to this simplified construction designed for particular induction conditions as regards chamber construction, filter arrangement and the cross-section of the pipe 1d.

Figure 10:
Figure 10 is a sectional view of a modified detail of the construction shown in Figure 9.

The construction according to Figure 9 may be varied by the employment of a transverse pipe 1e such as shown in Figure 10. This pipe is closed at its inner end, but has a lateral outlet aperture 9c.

I claim:

1. An intake silencer for a carburetor of an internal combustion engine, comprising a casing defining a chamber opening in a predetermined direction to the carburetor and including an end wall arranged opposite to the opening, and an entry pipe having a smooth internal surface and extending through said chamber transversely to said direction and communicating at least at one end thereof freely with the atmosphere, the air flowing into said chamber through said entry pipe and out of the chamber via the chamber opening in a direction transverse to said pipe, said chamber having larger cross sectional areas transverse to said predetermined direction than the cross sectional area of said entry pipe, said entry pipe defining an opening within said chamber at a position spaced from said casing.

2. A silencer according to claim 1 wherein the casing is metal.

3. A silencer according to claim 1 wherein the entry pipe is closed at one end.

4. A silencer according to claim 1 wherein said entry pipe has its opening directed toward the end wall and away from said chamber opening.

5. A silencer according to claim 1 wherein the casing is of an elastic material.

6. A silencer according to claim 5 wherein the casing is rubber.

7. A silencer according to claim 5 wherein said casing is a one-piece corrugated member.

8. A silencer according to claim 5 wherein said casing tapers toward the opening of said chamber.

9. A silencer according to claim 5 wherein said casing tapers conically away from the opening of said chamber.

10. A silencer according to claim 1 wherein said entry pipe includes ends projecting outside of said casing.

References Cited in the file of this patent

UNITED STATES PATENTS

| | | |
|---|---|---|
| 1,521,400 | Shaw | Dec. 30, 1924 |
| 2,114,783 | Kowitt | Apr. 19, 1938 |
| 2,152,205 | Morrison | Mar. 28, 1939 |
| 2,323,955 | Wilson | July 13, 1943 |
| 2,328,236 | Stoner | Aug. 31, 1943 |
| 2,511,713 | Hoyle et al. | June 13, 1950 |
| 2,512,823 | Blundell | June 27, 1950 |
| 2,517,623 | Baird | Aug. 8, 1950 |
| 2,705,546 | Chaffey | Apr. 5, 1955 |

FOREIGN PATENTS

| | | |
|---|---|---|
| 376,528 | Great Britain | Aug. 17, 1931 |
| 817,517 | France | May 24, 1937 |
| 495,962 | Great Britain | Nov. 22, 1938 |
| 104,770 | Sweden | June 16, 1942 |